United States Patent [19]

York

[11] Patent Number: 4,601,364
[45] Date of Patent: Jul. 22, 1986

[54] HUNTING SEAT

[76] Inventor: James A. York, 25450 Ryan Rd., Warren, Mich. 48091

[21] Appl. No.: 614,030

[22] Filed: May 25, 1984

[51] Int. Cl.[4] .................. A01M 31/02; A45F 3/26; A47C 9/10
[52] U.S. Cl. ........................ 182/187; 182/46; 108/152
[58] Field of Search ............ 182/187, 188, 46; 108/152; 297/DIG. 2

[56] References Cited

U.S. PATENT DOCUMENTS

| 882,850 | 3/1908 | Troell | 182/187 |
|---|---|---|---|
| 1,195,740 | 8/1916 | Samuelson | 182/188 |
| 1,206,574 | 11/1916 | Miller | 182/187 |
| 1,915,715 | 6/1933 | Bodendieck | 182/188 |
| 2,394,203 | 2/1946 | Pruder | 155/80 |
| 2,512,174 | 6/1950 | Roeder | 155/1 |
| 2,711,783 | 6/1955 | Prill | 108/152 |
| 2,851,085 | 9/1958 | Woodward | 155/78 |
| 2,855,980 | 10/1958 | Konieczka | 155/78 |
| 3,115,213 | 12/1963 | Cloutier | 182/187 |
| 3,352,379 | 11/1967 | Riggs | 182/187 |
| 3,419,108 | 12/1968 | Mobbs | 182/187 |
| 3,485,320 | 12/1969 | Jones | 182/187 |
| 3,822,813 | 7/1974 | Carter | 182/187 |
| 3,961,686 | 6/1976 | Starkey | 182/187 |
| 3,990,537 | 11/1976 | Swenson | 182/187 |
| 4,088,367 | 5/1978 | Atkinson | 297/DIG. 2 |
| 4,113,057 | 9/1978 | Bessinger | 182/187 |
| 4,236,602 | 12/1980 | Leggett | 182/187 |
| 4,484,660 | 11/1984 | Baynum | 182/187 |

FOREIGN PATENT DOCUMENTS 250321 12/1963 Australia .................. 108/132

Primary Examiner—Reinaldo P. Machado

[57] ABSTRACT

A hunter's seat comprising a platform having a channel adapted to receive a strap therethrough, the strap extending through said channel having a buckle for closing a loop in the strap to tightly engage the seat against a post or tree. The seat also includes a brace in the form of an inclined leg pivotally secured at one end to the platform so as to depend at an inclination so that its other end extends toward the tree. The buckle preferably includes a toggle lever for tightening the loop after slack has been removed from the loop so that it becomes tightly wrapped around the post. The leg includes a bracket with a plurality of steps which engage a wire loop suspended from the platform so that the angle of inclination of the platform with respect to the post can be adjusted. The platform is preferably made of one piece of plastic material and the leg is preferably formed from a separate single piece of plastic material.

20 Claims, 5 Drawing Figures

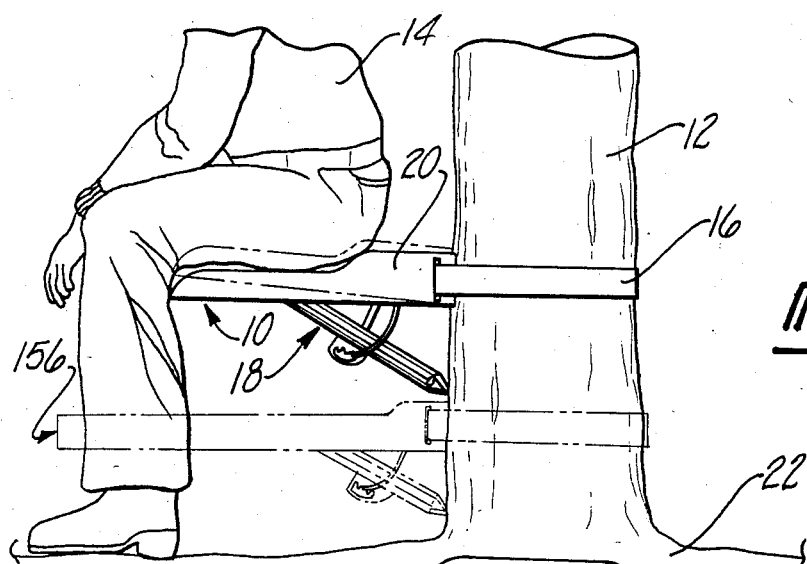
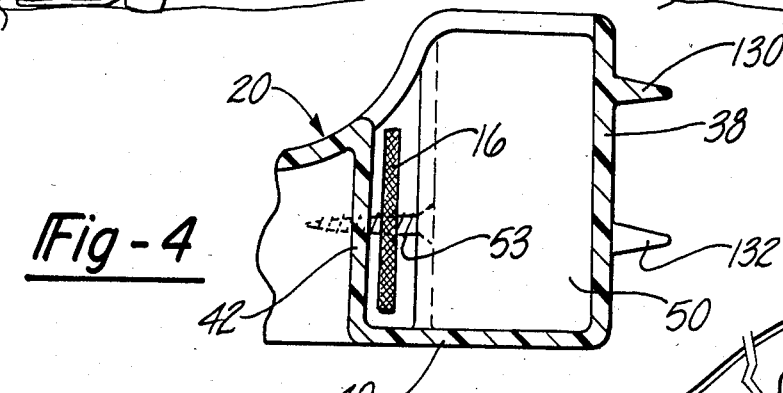
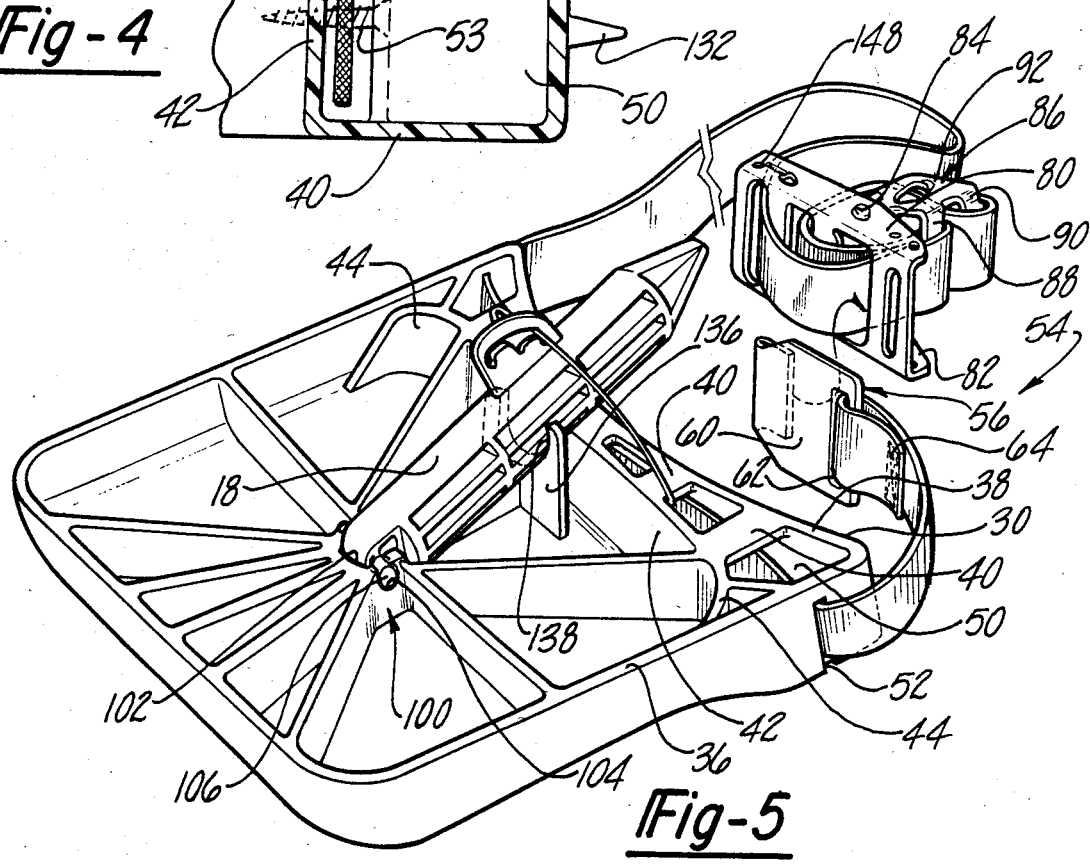

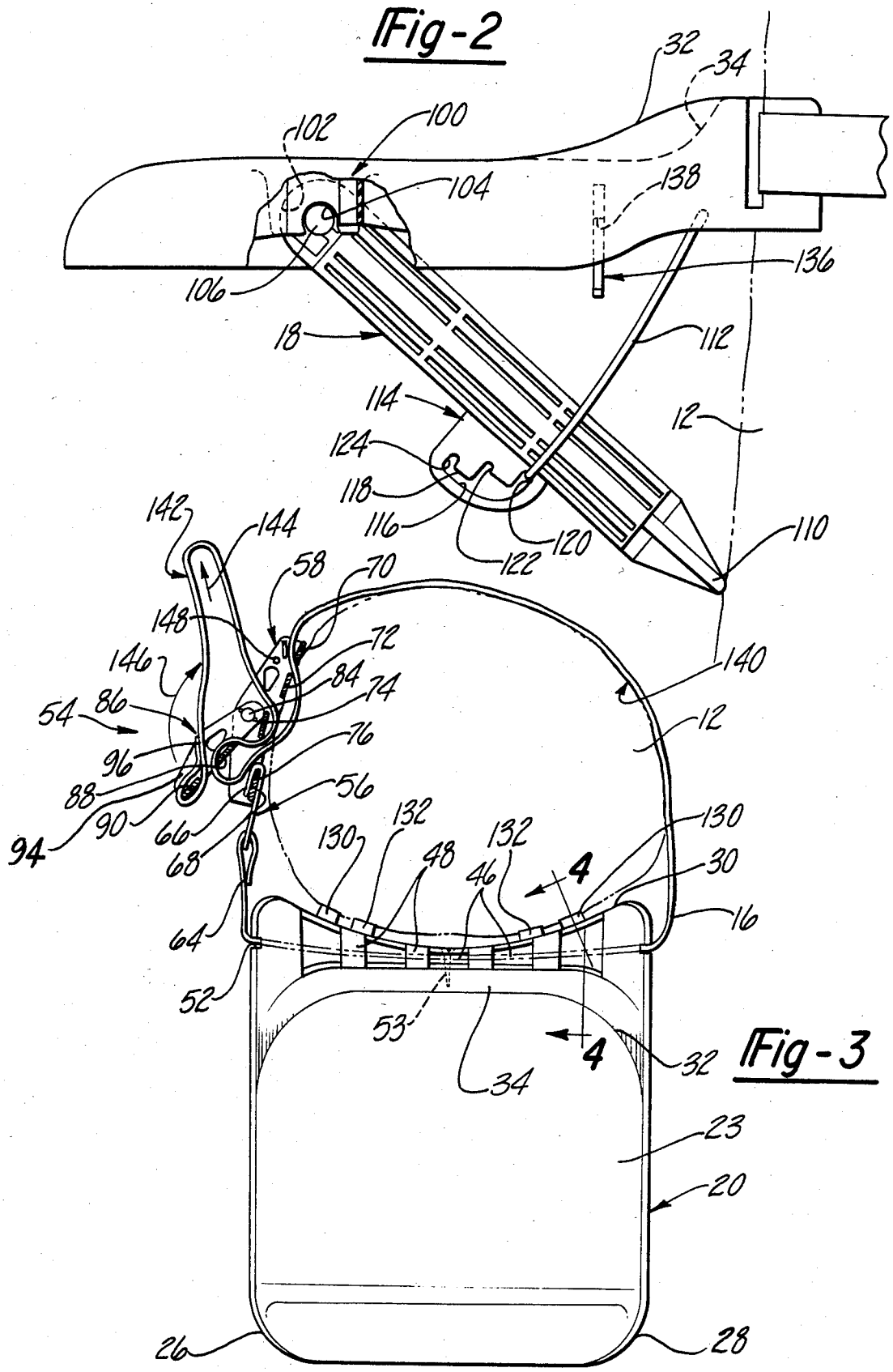

HUNTING SEAT

BACKGROUND OF THE INVENTION

I. Field of the Present Invention

The present invention relates generally to support structures, more particularly to a portable seat adapted to be secured to a verticle post such as a tree.

II. Description of the Prior Art

Hunters and others who spend a substantial amount of time in forests often desire to sit while resting. Since the ground in the forest is often damp or even snow covered during the winter months, the ground does not provide comfortable seating for the hunter. Moreover, previously known folding chairs can be bulky or unwieldy and difficult to transport through wooded areas. As a result, there is a substantial need for an easily portable seat which can be easily carried into the forest and which can be readily set up to provide a seating platform for the hunter.

While there are some previously known portable seats which can be secured to a tree trunk and thereby provide a seat raised above the ground surface, the previously known seats of this type are not well adapted for use by hunters. In particular, some of previously known hunting seats employ a chain which is wrapped around the tree to secure the seat to the tree. However, the chains are bulky, and cannot be stretched to tightly engage the tree. As a result, the seat is subject to slippage along the trunk of the tree while the seat is being used. In addition, chains are typically made of metal links for strength and can weigh a substantial amount whereby they substantially increase the burden of the hunter carrying such a seat. Moreover, the metal chains can be noisy when jostled about by a moving hunter, and such noises are a substantial disadvantage to the hunter stalking wild game.

In addition, other parts of the previously known hunter's seats are often made of metal and thus contribute to the noise and weight of the previously known hunting seats. Moreover, such seats are subject to squeaks and rattles when the hunter moves or dismounts the seats, especially when the previously known hunters seats employ a plurality of interconnected parts such as braces and seat backs formed separately from and connected to a seating platform.

SUMMARY OF THE PRESENT INVENTION

The present invention overcomes the above mentioned disadvantages by providing a lightweight, noiseless seat adapted to be tightly engaged against a post, tree trunk or the like and supported by a tree engaging brace. The seat generally comprises a seat platform and means for detachably securing the platform to a post so that the platform extends substantially horizontally outward from the post. Preferably, such a means comprises a flexible elongated strap and a coupling means for tightly engaging the strap around the post. In addition, a leg pivotally secured to the bottom of the platform is inclined toward the rear of the seat so that an end of the leg engages the post below the platform.

In the preferred embodiment, the seat and leg are made of plastic to provide noise damping as well as lighter weight for the hunter's seat. Furthermore, the seat parts and strap are weather resistant and rust proof. Moreover, all parts are interlocked with each other so that no parts can loosen and become lost while the seat is being transported. In addition, the angle of inclination of the leg is adjustable so that the inclination of the seat can be adjusted and remain horizontal despite irregularities in the post or tree and to compensate for varying weights of the persons who use the seat or provide desired angles of inclination. Moreover, the strap preferably includes coupling means which includes a toggle for tightly engaging the strap around the post in a desired position. In addition, the buckle includes means for adjusting the length of the strap so that the seat can be used with posts or trees of various diameters. In addition, the elongated strap can form a carrying handle or shoulder strap. Furthermore, the rear of the seating platform preferably includes a plurality of projections adapted to engage the post, and the end of the leg which engages the tree is preferably pointed.

Thus, the present invention provides a portable hunter seat which is easy to carry and which provides a stable seating platform raised above a ground surface. Moreover, the seat platform as well as the parts attached thereto are constructed to avoid undesirable noise during use or transportation of the seat. Furthermore, the means for connecting the seat to the tree is substantially easier to operate and more effective than previously known seat mounting devices.

BRIEF DESCRIPTION OF THE DRAWING

The present invention will be more clearly understood by reference to the following detailed description of a preferred embodiment when read in conjunction with the accompanying drawing in which the like reference characters refer to like parts throughout the views and in which:

FIG. 1 is a side plan view showing a seat constructed in accordance with the present invention in its operative position;

FIG. 2 is an enlarged fragmentary side plan view of the seat shown in FIG. 1 with portions removed for the sake of clarity;

FIG. 3 is a top plan view of the seat shown in FIG. 1;

FIG. 4 is an enlarged sectional view taken substantially along the line 4—4 in FIG. 3; and FIG. 5 is a bottom perspective view of the device shown in FIGS. 1-4.

DETAILED DESCRIPTION OF THE PREFERRED EMBODIMENT OF THE PRESENT INVENTION

Referring first to FIG. 1, a seat 10 according to the present invention is thereshown secured to a tree trunk so that a person 14 can be seated thereon. It can be seen that the seat is supported solely by the tree trunk 12 and does not include any ground engaging members. In general, a support strap 16 is tightly engaged about the tree 12, and a brace in the form of a leg 18 rigidly supports a seat platform 20 in a substantially horizontal alignment above the ground surface 22. Nevertheless, as shown in phantom line in FIG. 1, seat 10 can be tilted at a slight angle as may be desired by the person 14 as will be described in greater detail hereinafter.

Referring now to FIG. 3, the platform 20 has a generally rectangular shape with rounded corners such as is shown at 26 and 28 and having a concave rear edge 30. In addition, the upper surface 23 of the platform 20 can be contoured as shown at 32 and 34 in FIGS. 2 and 3 in order to comfortably conform with the shape of persons buttocks. Alternatively, the upper surface of the platform could be flat so the platform forms a standing platform upon which the hunter can stand. In any event, the platform 20 is preferably formed from one piece of plastic material and the leg 18 is made of a separate plastic piece adapted to be displaceably locked to the platform 20 as will be described hereinafter.

Referring now to FIG. 5, a flange 36 depending from the upper surface 23 of the platform 20 forms a side wall around the entire periphery of the platform 20. The rear portion of the peripheral wall 36 at the edge 30, hereinafter called the rear wall 38, is connected at its bottom by spans 40 to a support wall 42 positioned inwardly of the back wall 38. The support wall 42 includes curved end portions 44 extending beneath the contoured portions 32 and 34 of the platform 22 in order to provide rigid support beneath the contoured sections. The upper surface 23 of the platform 20 intermediate front wall 42 and the rear wall 38 includes apertures 46 intermediate spans 48 as shown in FIG. 3. Thus the walls 38 and 42 and the spans 40 and 48 define a channel means for forming a hollow area within the seat for receiving connecting means such as the strap 16 therethrough. The hollow channel means 50 communicates exteriorly of platform 20 by the elongated slots 52 on opposite sides of the seat platform 20. The strap is fixedly secured within the channel means 50 by an anchoring bolt 53 installed through said strap and rear wall 38 near the center of the seat (see FIG. 4).

Referring now to FIGS. 3 and 5, the ends of the strap 16 extending out of the slots 52 are secured to portions of a buckle assembly 54. A first buckle portion 56 comprises a flat plate 60 having an aperture 62 through which an end of the strap 16 is inserted. The end of the strap is looped and secured to an adjacent portion of the strap by a stitching or the like as shown at 64 to secure the strap 16 to the buckle portion 56. The other end of the plate 60 includes a return bent flange 66 forming a recess 68.

A second buckle portion 58 includes a plurality of spaced apart ribs 70, 72, 74 and 76 joined at their ends by side walls 80 and 82. The side walls 80 and 82 support an axle 84 pivotally securing a toggle lever 86 between the side walls of the bracket portion 58. The toggle lever 86 includes spaced apart ribs 88 and 90 secured across side walls 92 (FIG. 5) and 94 (FIG. 3). The other end of the strap 16 is inserted through the space between ribs 70 and 72 and then up through the space between ribs 74 and 76 into the space between the ribs 88 and 90 of the toggle lever 86. The strap 16 is further threaded around the rib 74 and again inserted through the space between ribs 88 and 90 whereby the end of the strap is looped around the rib 90 and secured to an adjacent portion of the strap as shown at 96 in FIG. 3. The buckle portion 58 is secured to the buckle portion 56 by sliding the rib 76 within the recess 68 formed in buckle portion 56.

Referring now to FIGS. 2 through 5, the bottom of the platform 20 also includes a housing means 100 forming a socket 102 adapted to pivotally receive an end of the leg 18 near the center of the platform. The peripheral walls of the housing means 100 include substantially C-shaped recesses 104 on opposite sides of the housing means 100. The recesses 104 receive axle stubs 106 extending outwardly from opposite sides of the leg 18. The recesses lockingly engage the axle stubs 106 for pivotal movement therein. Moreover, as by shown in the dotted lines in FIG. 2, the end of the leg 18 is radiused to conform with the shape of the socket 102. The pivot axis is aligned so that the leg 18 pivots within a plane perpendicular to the center of the rear wall 38.

In addition, additional guidance means permits the leg to be inclined at a desired angle and limits the inclination so that the other end 110 of the leg 18 is positioned for engagement with the tree trunk 12. In the preferred embodiment, the guidance means comprises a plastic coated wire loop 112 which limits the extent to which the end 110 of the leg 18 can be pivoted away from the bottom of the platform 20. The wire loop 112 is looped through the apertures intermediate the ribs 40 in the bottom of the platform 20 and extend through the channel means 50 of the platform. In addition, the loop 112 extends through an aperture 116 of a bracket 114 secured to the lower side of the leg 18. The uppermost periphery of the aperture 116 is formed by a stepped wall 118 extending outwardly from the leg and having a notch 120, a notch 122, and a notch 124 adapted to receive the wire loop 112 at three different positions, and thereby providing different inclinations for the leg 18. The notch 120 is closest to the periphery of the leg 18, and placement of the wire loop 112 within the notch 120 is used to provide a flat arrangement of a platform 20, whereas engagement of the wire loop 112 in the groove 122 or 124 is spaced farther apart from the periphery of the leg 18 causing tilting of the seat as shown in phantom line in FIG. 1.

Preferably, the end 110 of the leg 18 is pointed so that the pressure applied to the leg 18 by the person 14 sitting on the seat 10 causes the end 110 of the leg 18 to wedge into the outer part of the tree trunk 12 and rigidly support the seat in a fixed position. In addition, the rear wall 38 preferably includes pairs of projections such as projections 130 and 132 shown in FIGS. 3 and 4. Preferably, the projections in each pair are equidistantly spaced from the center of the rear wall 38. Each pair can be placed at a different height on the rear wall 38 as shown at FIG. 4.

While the leg 18 is free to pivot within wire loop 112, the bottom of the platform 20 includes a bracket 136 having a recess 138 in which the leg 18 can be frictionally engaged. As a result, the leg 18 can be fixedly secured to the seat bottom during transportation. Such fixed positioning of the leg 18 with respect to the platform 20 avoids unnecessary movement, and thus, noises which can alert wild game in the hunters presence.

A plurality of ribs extend between the peripheral wall 36 and the housing means 100 to make the seat more rigid. In addition, additional ribs can extend between support wall 42 and the housing means 100 to add additional rigidity to the seat.

Having thus described the important structural features of a seat according to the present invention, the installation of the device can be readily described. Referring to FIG. 3, it can be seen that the end of the strap 16 containing buckle portion 58 is wrapped around the tree trunk 12 and engaged with the buckle portion 56 as previously described, and thus forming a loop 140 extending around the trunk 12. In addition, since the loop 140 can be substantially longer than the circumference of trunk 12, an additional loop 142 is formed as shown at 142 in FIG. 3 which is expanded in the direction of arrow 144 to remove slack in the loop 140. Once the slack has been removed from the loop 140, toggle lever 86 is pivoted in the direction of arrow 146 in FIG. 3, which locks the loop 140 into tight engagement with the tree trunk 12. Toggle lever 86 is retained in its locked position by detents 148 in the sides 80 and 82 (FIG. 5) of the buckle portion 58.

The tight engagement caused by the lever action of the lever 86 causes one or more pairs of projections 130 and 132 to be tightly engaged against the tree trunk to stably position the seat 10 on the trunk. Thus the projections and the blunt pointed end 110 of the leg 18 ensure that the seat remains at a fixed position with respect to the trunk of the tree. Nevertheless, the resiliency of the plastic material used to form the projections and the leg avoid defacement or injury to the tree trunk to which the seat is attached, although the limited surface area of the projections and the end 110 of the leg 18 provide secure and rigid attachment of the seat to the tree. Moreover, such secure attachment avoids relative movement between the pieces of the seat which can cause noise during use of the seat as has often occured in the previously known tree-mounted seats. In addition, it will be understood that the seat can be mounted at any desired height above the ground surface, since the support leg is not required to engage the ground surface, and at a plurality of inclinations as desired by the user. Thus, regardless of whether the platform is used as a seating platform or a standing platform, it provides a stable support at any desired height along a tree trunk.

After the seat has been used, toggle lever 86 is moved in a direction opposite to the arrow 146 shown in FIG. 3, thereby releasing the strap 16 for enlargement of the loop 140. When loop 140 has been enlarged enough, the bracket portion 58 can be disengaged from the bracket portion 56 by sliding the rib 76 out of the recess 68. Strap 16 can then be attached by wrapping the loop 140 about the body or torso of the hunter so that the seat can be worn as a belt. Alternatively, one of the loops 140 or 142 can be expanded to form a shoulder strap for carrying the seat. In any event, the leg 18 is pivoted and snapped into the recess 138 of bracket 136 so that there are no loose parts which can rattle as the hunter continues to travel.

In addition, it will be understood that platform 20 can be formed with one piece of plastic, and the leg 18 can be formed from another piece of plastic thus providing a lightweight construction with a minimum of relatively displaceable parts. Thus, further rattles and squeaks which can occur when numerous parts are connected together by rivets and other fasteners are eliminated. Moreover, the seat is compact and convenient to transport. In addition, it is weather resistant and rustproof. Furthermore, the seat provides a stable resting place for hunters of all weight and heights and the parts of the seat will not detach and become lost while being jostled during transportation through thick brush.

Having described my invention, many modifications hereto will become apparent to those skilled in the art to which it pertains without departing from the scope and spirit of the present invention as defined in the appended claims. For example, due to the light weight and ease of transporting the device, it is conceived that a separate standing platform can be used in conjunction with the seating platform to provide a seat and footrest combination at any desired height above a ground surface. Of course, in such a case, the standing platform is preferably longer than the seating platform so that it extends outwardly beyond the front edge of the seating platform, as shown in phantom line at 156 in FIG. 1. Thus, while the specification and claims may refer to the invention as a portable seat, it is to be understood that the term seat is not used restrictively since it should be readily understood that a platform apparatus can be within the scope of the present invention regardless of whether the hunter stands or sits on the platform constructed in accordance with the present invention.

What is claimed is:

1. A portable seat adapted to be mounted to a vertical post comprising:
    a platform having a concave rear edge, and means for detachably securing said platform to the vertical post at said rear edge so that said platform extends substantially horizontally outward from said post, said means comprising:
    a flexible strap substantially longer than the circumference of the post, means for securing said strap to said platform, and coupling means for coupling said strap in tight circumferential engagement with the post,
    a support leg, and means for pivotally securing one end of said support leg to the bottom of said platform, including guidance means for adjustably inclining said leg toward rear edge of said platform so that the other end of said leg is positioned for engagement with said post below said seat; and
    wherein said means for securing said strap to said seat comprises channel means formed in said platform adjacent said rear edge for forming a hollow channel adapted to receive said strap.

2. The invention as defined in claim 1 wherein said rear edge comprises a substantially vertical wall portion.

3. The invention as defined in claim 2 wherein said substantially vertical wall portion includes a plurality of projections extending rearwardly of said wall for engagement with the post.

4. The invention as defined in claim 3 wherein said wall and said projections are formed integrally in one piece with said platform.

5. The invention as defined in claim 3 wherein said projections are arranged in pairs, the projections of each pair being equidistantly laterally spaced from the center of said substantially vertical wall portion.

6. A portable seat and footrest combination adapted to be mounted to a single vertical post wherein each of said seat and said footrest comprise:
    a platform having a concave rear edge; and
    a means for detachably securing said platform to the vertical post at said rear edge so that said platform extends substantially horizontally outward from said post; said means comprising;
    a flexible strap substantially longer than the circumference of the post, means for securing said strap to said platform, and coupling means for coupling said strap in tight circumferential engagement with the post; and
    a support leg, and means for pivotally securing one end of said support leg to the bottom of said platform, including guidance means for adjustably inclining said leg toward said rear edge of said platform so that the other end of said leg is positioned for engagement with said post below said seat; and
    wherein said means for securing said strap to said seat comprises channel means formed in said platform adjacent said rear edge for forming a hollow channel adapted to receive said strap.

7. A portable seat adapted to be mounted to a vertical post comprising:

a platform;

a means for detachably securing said platform to the vertical post at said rear edge so that said platform extends substantially horizontally outward from said post, said means comprising;

a flexible strap substantially longer than the circumference of the post, means for securing said strap to said platform, and coupling means for coupling said strap in tight circumferential engagement with the post;

a support leg, and means for pivotally securing one end of said support leg to the bottom of said platform, including guidance means for adjustably inclining said leg toward said rear edge of said platform so that the other end of said leg is positioned for engagement with said post below said seat;

said means for securing said strap to said seat comprises channel means formed in said platform adjacent said rear edge for forming a hollow channel adapted to receive said strap.

8. The invention as defined in claim 7 and further comprising means for fixedly securing said strap within said channel.

9. The invention as defined in claim 7 wherein said other end of said leg is pointed.

10. The invention as defined in claim 7 wherein said means for pivotally securing comprises housing means for defining a socket on the bottom of said platform, wherein said one end of said leg is radiused to conform with said socket, and further comprising means for pivotally retaining said one end in said socket.

11. The invention as defined in claim 7 and further comprising means for detachably retaining said leg in a fixed position with respect to said platform.

12. The invention as defined in claim 10 wherein platform includes a peripheral wall and further comprising a plurality of ribs extending between said peripheral wall and said housing means.

13. The invention as defined in claim 12 wherein said peripheral wall and said ribs are integrally formed in one piece with said platform.

14. The invention as defined in claim 7 wherein said coupling means comprises a first buckle portion secured to one end of said strap, a second buckle portion secured at the other end of said strap and having means for adjustably fixing the length of said strap intermediate said first and second buckle portion, and means for detachably connecting said first buckle portion to said second buckle portion.

15. A portable seat adapted to be mounted to a vertical post comprising:

a platform having a concave rear edge, and means for detachably securing said platform to the vertical post at said rear edge so that said platform extends substantially horizontally outward from said post, said means comprising:

a flexible strap substantially longer than the circumference of the post, means for securing said strap to said platform, and coupling means for coupling said strap in tight circumferential engagement with the post;

a support leg, and means for pivotally securing one end of said support leg to the bottom of said platform, including guidance means for adjustably inclining said leg toward said rear edge of said platform so that the other end of said leg is positioned for engagement with said post below said seat and further comprising means for detachably retaining said leg in a fixed position with respect to said platform; and wherein said means for detachably retaining comprises a flange extending outwardly from the bottom of said platform and having a recess in its free end dimensioned to frictionally engage said leg.

16. The invention as defined in claim 15 wherein said flange is integrally formed in one-piece with said platform.

17. A portable seat adapted to be mounted to a vertical post comprising:

a platform having a concave rear edge; and a means for detachably securing said platform to the vertical post at said rear edge so that said platform extends substantially horizontally outward from said post, said means comprising:

a flexible strap substantially longer than the circumference of the post, means for securing said strap to said platform, and coupling means for coupling said strap in tight circumferential engagement with the post;

a support leg, and means for pivotally securing one end of said support leg to the bottom of said platform, including guidance means for adjustably inclining said leg toward said rear edge of said platform so that the other end of said leg is positioned for engagement with said post below said seat; and wherein said means for pivotally securing comprises housing means for defining a socket on the bottom of said platform, wherein said one end of said leg is radiused to conform with said socket, and further comprising means for pivotally retaining said one end in said socket; and wherein said means for pivotally retaining comprises substantially C-shaped recesses on opposite side of said housing means, and a pair of axle stubs extending laterally outwardly from opposite sides of said leg adapted to be received in said recesses.

18. The invention as defined in claim 17 wherein said housing means is integrally formed in one piece with said platform and said axle stubs are integrally formed in one piece with said leg.

19. A portable seat adapted to be mounted to a vertical post comprising:

a platform having a concave rear edge; and a means for detachably securing said platform to the vertical post at said rear edge so that said platform extends substantially horizontally outward from said post, said means comprising:

a flexible strap substantially longer than the circumference of the post, means for securing said strap to said platform, and coupling means for coupling said strap in tight circumferential engagement with the post, a support leg, and means for pivotally securing one end of said support leg to the bottom of said platform, including guidance means for adjustably inclining said leg toward said rear edge of said platform so that the other end of said leg is positioned for engagement with said post below said seat; and wherein said guidance means comprises a bracket secured to said leg having at least two steps, and further comprising means suspended from said platform for supporting said leg from one of said steps.

20. A portable seat adapted to be mounted to a vertical post comprising:
- a platform having a concave rear edge; and
- a means for detachably securing said platform to the vertical post at said rear edge so that said platform extends substantially horizontally outward from said post, said means comprising:
- a flexible strap substantially longer than the circumference of the post, means for securing said strap to said platform, and coupling means for coupling said strap in tight circumferential engagement with the post;
- a support leg, and means for pivotally securing one end of said support leg to the bottom of said platform, including guidance means for adjustably inclining said leg toward said rear edge of said platform so that the other end of said leg is positioned for engagement with said post below said seat; and
- wherein said coupling means comprises a first buckle portion secured to one end of said strap, a second buckle portion secured at the other end of said strap and having means for adjustably fixing the length of said strap intermediate said first and second buckle portion, and means for detachably connecting said first buckle portion to said second buckle portion; and
- wherein said second buckle portion includes toggle means for tightening said strap when said first and second buckle portions are connected.

* * * * *

UNITED STATES PATENT AND TRADEMARK OFFICE
CERTIFICATE OF CORRECTION

PATENT NO. : 4,601,364

DATED : July 22, 1986

INVENTOR(S) : JAMES A. YORK

It is certified that error appears in the above-identified patent and that said Letters Patent is hereby corrected as shown below:

Column 1, Line 42, "moves" should be --mounts--;

Column 8, Line 56, Claim 19, "," should be --;--.
(Amendment dated 2-12-86)

Signed and Sealed this

Twenty-first Day of October, 1986

[SEAL]

*Attest:*

DONALD J. QUIGG

*Attesting Officer*    *Commissioner of Patents and Trademarks*